Jan. 17, 1961 W. L. HOFF Re. 24,923

COLOR CODING APPARATUS

Original Filed April 22, 1955 2 Sheets-Sheet 1

INVENTOR
W. L. HOFF
BY W. C. Parnell
ATTORNEY

Jan. 17, 1961 W. L. HOFF Re. 24,923

COLOR CODING APPARATUS

Original Filed April 22, 1955 2 Sheets-Sheet 2

INVENTOR
W. L. HOFF
BY W. C. Parnell
ATTORNEY

United States Patent Office

Re. 24,923
Reissued Jan. 17, 1961

24,923

COLOR CODING APPARATUS

Wilbur L. Hoff, Downers Grove, Ill., assignor to Western Electric Company, Incorporated, New York, N.Y., a corporation of New York Original No. 2,865,323, dated Dec. 23, 1958, Ser. No. 503,293, Apr. 22, 1955. Application for reissue May 25, 1959, Ser. No. 815,764

10 Claims. (Cl. 118—314)

Matter enclosed in heavy brackets [ ] appears in the original patent but forms no part of this reissue specification; matter printed in italics indicates the additions made by reissue.

This invention relates to color coding apparatus and more particularly to apparatus for making colored markings of different number, size and arrangement on *articles to be identified such as* insulated wire [for the purpose of identification].

Development work in progress pointing toward the general use of thermoplastic insulation in central office switchboard wires and cables presented the problem of developing a satisfactory method of color coding these plastic covered wires. Because of the large number of wires involved, the longitudinal stripe method previously employed would not provide enough color codes for the identification of all of these wires in the cables.

*An object of the invention is to provide new and improved color coding apparatus.*

[The] *A further* object of the invention is the solution to this problem embodied in an apparatus which, although simple in structure, is readily adaptable for efficiently marking numerous color codes on *an elongated article such as an* insulated wire.

With [this] *these* and other objects in view, *an embodiment of* the invention comprises a hollow wheel for a coloring liquid having spaced apertures in the periphery thereof in predetermined arrangements whereby rotation of the wheel relative to the path of a longitudinally moving insulated wire will cause streams of the coloring liquid passing from the apertures to form varied arrangements of code markings on the insulated wire.

In the present embodiment of the invention, there are two wheels with like apertures in the peripheries thereof disposed in out of line positions on opposing sides of the path of the wire but driven in synchronism with each other so that the markings started on the insulation of the wire by one of the wheels will be completed by the other wheel to form band-like color code markings at spaced positions throughout the length of the insulated wire. The coloring liquid is initially supplied in a receptacle and forced under predetermined like pressures to both wheels which are partially surrounded by a baffle housing adapted to receive the excess coloring liquid and direct it to the supply.

Other objects and advantages will be apparent from the following detailed description when considered in conjunction with the accompanying drawings, wherein.

The apparatus is mounted with respect to the path of a longitudinally advancing insulated wire 15 and includes wheels indicated generally at 16 and 17 disposed upon opposing sides of the path of the insulated wire and in out of line positions wtih respect to each other. The wheels are identical, but they are mounted on shafts 18 and 19 of different lengths to locate them in predetermined out of line positions.

Figure 3:
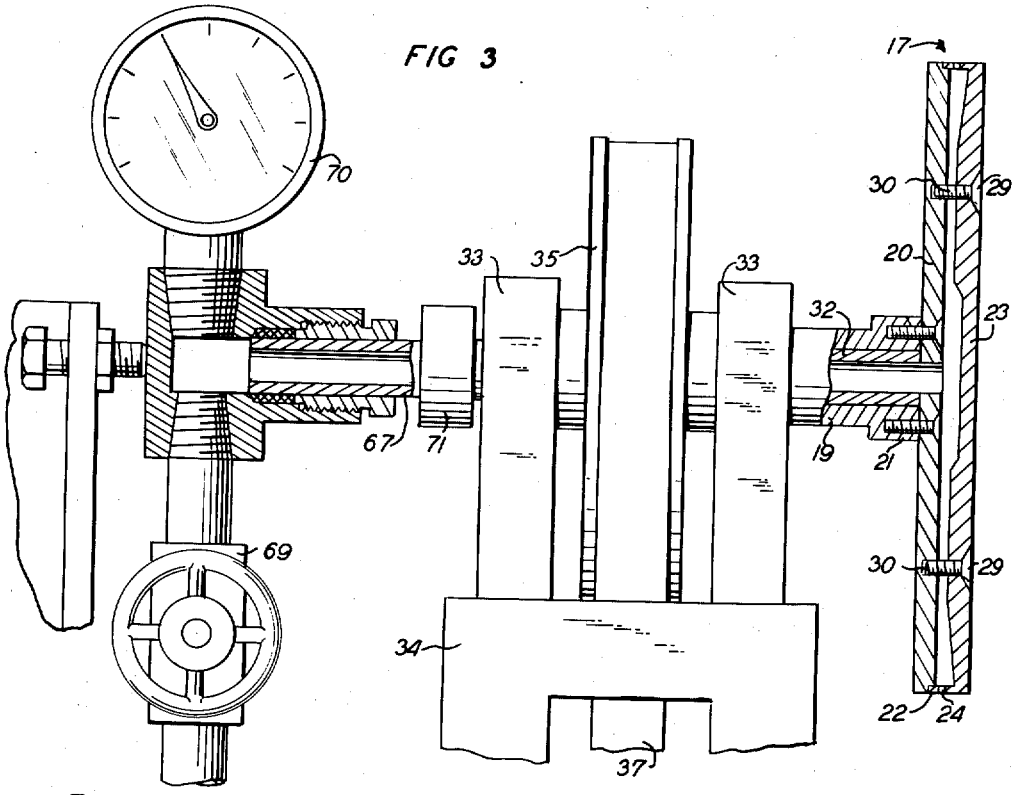
Fig. 3 is an enlarged fragmentary sectional view taken substantially along the line 3—3 of Fig. 1.
Figure 4:
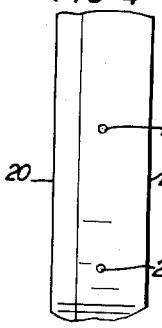
Figs. 4, 5, 6 and 7 are fragmentary side elevational views of either coding wheel illustrating different arrangements of apertures for different code markings on the wire.
Figure 5:
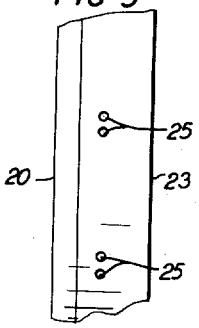
Figure 6:
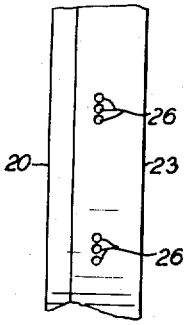

Each wheel has a fixed member 20 (Fig. 3) mounted on the flange 21 of its shaft 18—19 and provided with an annular recess in its periphery to receive an annular portion 22 of a removable member 23. The member 23 may have any desired arrangement of apertures therein including, for example, the single equally spaced apertures 24 (of Fig. 4) the spaced pairs of apertures 25 (of Fig. 5), the spaced group of apertures 26 (of Fig. 6) or the sets of apertures indicated at 27, each with a single and group of apertures. The removable members 23 have a circular arangement of like apertures 29 for screws 30 employed in removably securing the members 23 singly to the fixed member 20 of each wheel. The shafts 18 and 19 are hollow to receive fluid lines 32 and journalled in suitable bearings 33 mounted on a support 34. Pulleys 35 are mounted on the hollow shafts 18—19 and are connected to each other and to a drive pulley 36 by a belt 37. In the present embodiment of the invention, there is a belt-tightening roller 40 and a wheel adjusting roller 41. The roller 40 is supported by a pivotal arm 42 urged counterclockwise (Fig. 2) by a spring 43. The roller 41 is supported for vertical adjustment in a stationary guide 44 through the actuation of an adjusting screw 45 to synchronize the wheels so that the markings of the wheel 16 will match those of the wheel 17. In the present embodiment of the invention the belt 37 and the pulleys 35 and 36 are of the slipless type, whereby movement of the belt by the roller 41 will cause adjustment of the wheels at any time, preferably during operation of the apparatus.

Figure 12:
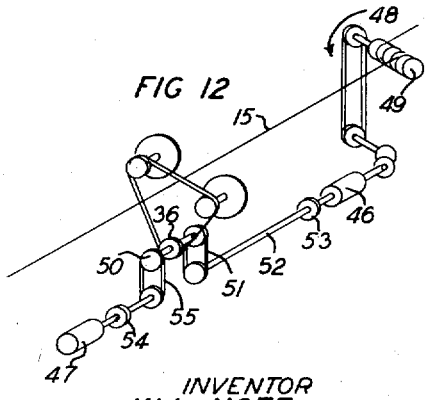
Fig. 12 is a schematic illustration of a power train for the apparatus.

The schematic illustration of the apparatus in Fig. 12 shows two power means or motors 46 and 47 for driving the wheels 16 and 17. The motor 46 is operatively connected through a mechanism, indicated generally at 48, to a grooved capstan 49 which constitutes the means for advancing the insulated wire longitudinally at a constant running speed of 2,000 feet per minute. The pulley 36 is mounted on a spindle 50 which may be driven by the motor 46 through a belt and pulley connection 51 with a shaft 52 when a magnetic clutch 53 is operated. This constitutes the normal driving means for the apparatus. The motor 47, through its magnetic clutch 54 and the belt and pulley connection 55 with the spindle 50 is employed to drive the wheels 16 and 17 while cleaning the apparatus of one coloring liquid and preparing it for another. The magnetic clutches are arranged in controlling circuits so that they must be operated singly. Also the driving means originating with the motor 46 and terminating in the capstan 49 and the wheels 16 and 17 results in the surface speed of the wheels being equal the linear speed of the wire, whereby the spacing of the apertures in the wheels for the coloring liquid will equal the spacing of the markings on the insulated wire.

Figure 1:
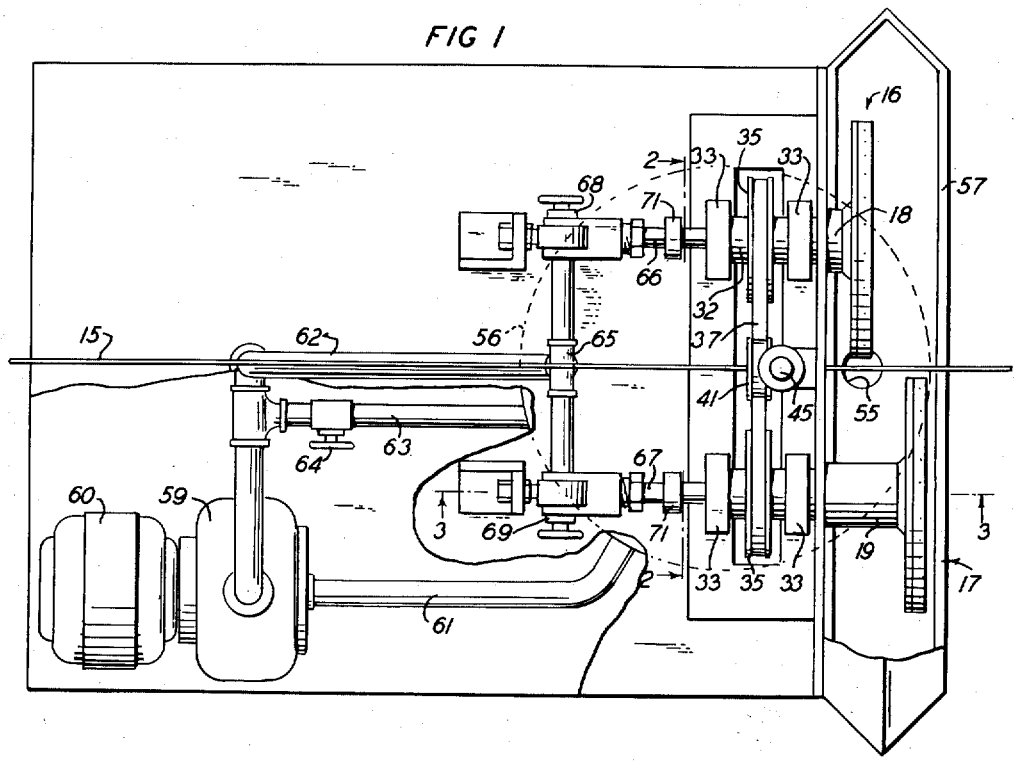
Fig. 1 is a top plan view of the apparatus, portions thereof being shown in section.
Figure 2:
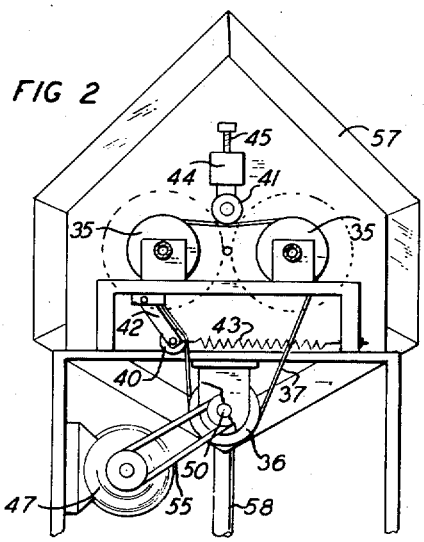
Fig. 2 is a front elevational view of the apparatus.

The coloring liquid for the wheels 16 and 17 is disposed initially in a receptacle or tank 56 positioned beneath a baffle-like housing 57 of the contour shown in Fig. 2. The housing 57 surrounds the path of the insulated wire 15 and the color coding wheels 16 and 17 providing angular surfaces, not only in the general contour of the housing but in the cross-sectional contour as well, causing the excess liquid coloring to travel downwardly to and through an outlet pipe 58 leading to the receptacle. Power means is provided to force the coloring liquid from the receptacle to the wheels under like variable pressures. This means includes a pump 59 driven by a motor 60 and adapted to receive the liquid coloring from the receptacle 56 through line 61 and force the liquid toward the wheels through line 62. A bypass line 63 leading from line 62 to the receptacle 56 includes a valve 64 which may be adjusted to allow a predetermined portion of the liquid from the pump to by-pass to the receptacle thereby controlling the amount of liquid to the wheels. The supply of liquid from line 62 is divided at 65 and directed in opposite directions through lines 66 and 67 through valves 68 and 69. In either one or both of the lines leading to the wheels 16 and 17, gage means 70 may be provided to indicate the pressure of the liquid directed to the wheels. Lines 66 and 67 are provided with suitable means 71 to connect these stationary lines to lines 32 in the rotatable hollow shafts 18 and 19 making the connection fluid tight so that the quantities of liquid for each wheel may be forced into the hollow wheels.

Considering now the operation of the apparatus, let it be assumed that the wheels 16 and 17 are *each* provided with the member 23 having the single apertures 24 therein. As the wire 15 advances longitudinally through the apparatus at a known speed, the wheels 16 and 17 will be driven in synchronism with each other at the same speed as the wire, whereby at certain intervals, fine streams of the coloring liquid *are* forced by pressure back of the liquid and by a centrifugal force, across the path of the strand. Although the wheels 16 and 17 rotate in the same direction, their positions on opposite sides of the wire result in the successive streams of coloring liquid from the apertures in wheel 16 whipping down on top of the wire and marking half the circumference of the insulation at each instance, and the successive streams of coloring liquid from the apertures in the wheel 17 whipping up from the bottom of the wire to complete the markings. If desired, the directions of rotation of the wheels may be reversed and accomplish the same results. The speed of each wheel is such that the markings on the insulation of the wire will not be spread noticeably longitudinally of the wire but will be substantially equal the like diameters of the holes 24 controlling the widths of the jets of coloring liquid. Furthermore, by synchronizing the speed of rotation of the wheels and the relative positioning of the apertures of the wheels, a marking made partially by a stream of coloring liquid from one aperture of the wheel 16 will be completed by a stream of coloring liquid from a companion aperture of the wheel 17 to produce a uniform band-like marking about the insulated wire for each pair of companion apertures 24 in the wheels 16 and 17.

Figure 9:
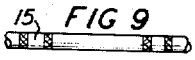

If each wheel includes a member 23 with the pairs of apertures 25 therein, a similar action will take place but the result will be the making of pairs of band-like uniform markings on the insulated covering of the wire as shown in Fig. 9.

Figure 7:
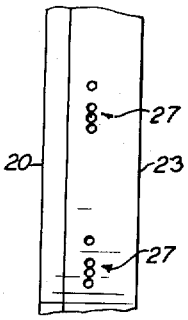
Figure 8:
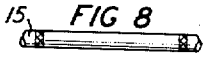
Figs. 8, 9, 10 and 11 are fragmentary side elevational views of portions of insulated wires illustrating respectively the results of wheels with groups of apertures as shown in Figs. 4, 5, 6 and 7.
Figure 10:
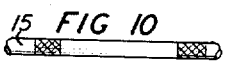
Figure 11:
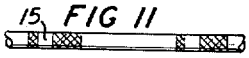

If the member 23 with the groups of apertures 26 therein should be mounted in each wheel, the closely positioned apertures in each group will result in a solid wide band-like marking on the insulated wire as shown in Fig. 10. However, if a spaced aperture is added to this group 26 (as shown in Fig. 7) to complete the arrangement 27, the result will be narrow and wide band-like markings shown in Fig. 11.

The narrow band-like markings are commercially known as dots while the wide band-like markings are known as dashes. Therefore, it is possible, merely through the selection of variable arrangements of apertures to produce numerous code markings with any desired number of dot markings, any desired number of dash markings or varied arrangements of these markings to identify different wires in a cable.

It is to be understood that the above described arrangements are simply illustrative of [the] *one* application of the principles of the invention. Numerous other arrangements may be readily devised by those skilled in the art which will embody the principles of the invention and fall within the spirit and scope thereof.

What is claimed is:

1. An apparatus for color coding [an insulated wire] *elongated articles* comprising means to advance [the insulated wire] *an elongated article to be color coded* in a longitudinal path and at a known linear speed, a hollow wheel for a coloring liquid having a peripheral member and a central inlet, means to feed the coloring liquid to the inlet, outlets of predetermined sizes for the wheel disposed in the peripheral member at positions spaced predetermined distances apart to direct streams of the coloring liquid radially from the wheel, means to rotatably support the wheel relative to [the] *said* path [of the insulated wire whereby] *so that* the streams of coloring liquid successively will be moved through the path, and means *operatively connected to said article-advancing means* to rotate the wheel [at a predetermined speed relative to] *and to maintain a fixed ratio between the peripheral speed of the wheel and* the linear speed of the [insulated wire to cause streams of the coloring liquid to pass through the outlets to] *article, said ratio for the predetermined sizes and spacings of the outlets being such that the portions of the radial streams intercepting the longitudinally advancing article* form *discrete, longitudinally spaced,* color code markings [,] on the [insulated wire,] *article* of *relative* sizes comparable to the *relative* sizes of the outlets and at *relative* positions on the [insulated wire] *article* comparable to the *relative* spacings of the outlets in the peripheral member.

2. An apparatus for *color* [coloring] coding *elongated articles* [an insulated wire] comprising means to advance *such an article* [the insulated wire] in a longitudinal path and at a known linear speed, a hollow wheel for a coloring liquid having a peripheral member and a central inlet, means to feed the coloring liquid to the inlet, outlets of predetermined sizes for the wheel disposed in the peripheral member at positions spaced predetermined distances apart to direct streams of the coloring liquid radially from the wheel, means to rotatably support the wheel relative to [the] *said* path [of the insulated wire whereby] *so that* the streams of coloring liquid successively will be moved through the path, and means *operatively connected to said article-advancing means* to rotate the wheel at a [predetermined] speed *such that the peripheral speed of the wheel matches* [relative to] the linear speed of the [insulated wire to cause streams of the coloring liquid to pass through the outlets to] *article so that the portions of the radial streams intercepting the longitudinally advancing article* form *discrete, longitudinally spaced,* color code markings [,] on the *article* [insulated wire,] of *relative* sizes comparable to the *relative* sizes of the outlets [and at positions on the insulated wire comparable to the spacing of the outlets in the peripheral member, single outlets in the peripheral member spaced like distances apart cause their streams of coloring liquid to form narrow band-like markings identified as dots] , *the spacings of the markings on the article being substantially equal to the respective circumferential spacings between the outlets.*

3. An apparatus for color coding *elongated articles* [an insulated wire] comprising means to advance *such an article* [the insulated wire] in a longitudinal path and at a known linear speed, a hollow wheel for a coloring liquid having a peripheral member and a central inlet, means to feed the coloring liquid to the inlet, outlets of predetermined sizes for the wheel disposed in the peripheral member at positions spaced predetermined distances apart to direct streams of the coloring liquid radially from the wheel, *at least some of said outlets being arranged in a predetermined pattern of groups of outlets, the spacing between adjacent groups being substantially greater than the spacing between two adjacent outlets of the same group,* means to rotatably support the wheel relative to the path [of the insulated wire whereby] *so that* the streams of coloring liquid successively will be moved through the path, and means *operatively connected to said article-advancing means* to rotate the wheel [at a predetermined speed relative to] *and to maintain a fixed ratio between the peripheral speed of the wheel and* the linear speed of the [insulated wire to cause streams of the coloring liquid to pass through the outlets to] *article, said ratio for the predetermined sizes and spacings of the outlets being such that portions of the radial streams intercepting the article* form *discrete, longitudinally spaced,* color code markings [,] on the *article* [insulated wire,] of *relative* sizes comparable to the *relative* sizes of the outlets and at *relative* positions on the *article* [insulated wire] comparable to the *relative* spacing of the outlets in the peripheral member, [groups of outlets in the peripheral member with the groups spaced known distances apart and] the outlets in each group *being* positioned sufficiently close to each other [to] *that the markings produced by the streams from one group of outlets overlap to* jointly from *a* wide band-like marking[s] *on the article representing* [known as] *a* dash[es] *and the spacing between adjacent groups being sufficiently wide to produce a series of longitudinally spaced dashes.*

4. An apparatus for color coding *elongated articles* [an insulated wire] comprising means to advance the *article* [insulated wire] in a longitudinal path and at a known linear speed, a hollow wheel for a coloring liquid having a peripheral member and a central inlet, means to feed the coloring liquid to the inlet, outlets of predetermined sizes for the wheel disposed in the peripheral member at positions spaced predetermined distances apart to direct streams of the coloring liquid radially from the wheel, *said outlets being arranged in a predetermined pattern comprising groups of closely spaced outlets, and single outlets interposed between said groups, the spacing between any group and an adjacent single outlet being substantially greater than the spacing between adjacent outlets of a group,* means to rotatably support the wheel relative to the path [of the insulated wire whereby] *so that* the streams of coloring liquid successively will be moved through the path, and means *operatively connected to said article-advancing means* to rotate the wheel [at a predetermined speed relative to] *and to maintain a fixed ratio between the peripheral speed of the wheel and* the linear speed of the [insulated wire to cause streams of the coloring liquid to pass through the outlets to] *article, said ratio for the predetermined sizes and spacings of the outlets being such that the portions of the radial streams intercepting the article* form *discrete, longitudinally spaced,* color code markings [,] on the *article* [insulated wire,] of *relative* sizes comparable to the *relative* sizes of the outlets and at *relative* positions on the *articles* [insulated wire] comparable to the *relative* spacing of the outlets in the peripheral member, single [widely spaced] outlets [with an adjacent group] *and groups* of closely [positioned] *spaced* outlets [in the peripheral member] causing single and grouped streams of the coloring liquid *respectively* to form [respectively] *longitudinally spaced, relatively* narrow and wide band-like markings *respectively on the article, the wide band-like marking being formed by an overlapping of the markings produced by the streams from said closely spaced outlets of a group* [known respectively as dot and dash markings].

5. An apparatus for color coding *elongated articles* [an insulated wire] comprising means to advance *such an article* [the insulated wire] in a longitudinal path and at a known linear speed, a hollow wheel for a coloring liquid having a peripheral member and a central inlet, means to feed the coloring liquid to the inlet, outlets of predetermined sizes for the wheel disposed in the peripheral member at positions spaced predetermined distances apart to direct streams of the coloring liquid radially from the wheel, means to rotatably support the wheel relative to [the] *said* path [of the insulated wire whereby] *so that* the streams of coloring liquid successively will be moved through [the] *said* path, a supply receptacle for the liquid coloring, means to force the liquid coloring from the supply receptacle through the feeding means, the inlet, the wheel and through the outlets at a given pressure to cause the streams of the liquid coloring passing through the outlets to traverse the path, and means *operatively connected to said article-advancing means* to rotate the wheel [at a predetermined speed relative to] *and to maintain a fixed ratio between the peripheral speed of the wheel and* the linear speed of the [insulated wire to cause streams of the coloring liquid to pass through the outlets to] *article, said ratio for the predetermined sizes and spacings of the outlets being such that the portions of the radial streams intercepting the longitudinally advancing article* form [color code markings,] on the [insulated wire,] *article discrete, longitudinally spaced, color code markings* of *relative* sizes comparable to the *relative* sizes of the outlets and at *relative* positions on the [insulated wire] *article* comparable to the *relative* spacing of the outlets in the peripheral member.

6. An apparatus for color coding *elongated articles* [an insulated wire] comprising means to advance *such an article* [the insulated wire] in a longitudinal path and at a known linear speed, a hollow wheel for a coloring liquid having a peripheral member and a central inlet, means to feed the coloring liquid to the inlet, outlets of predetermined sizes for the wheel disposed in the peripheral member at positions spaced predetermined distances apart to direct streams of the coloring liquid radially from the wheel, means to rotatably support the wheel relative to the path [of the insulated wire whereby] *so that* the streams of coloring liquid successively will be moved through [the] *said* path, a supply receptacle for the liquid coloring, means to force the liquid coloring from the supply receptacle through the feeding means, the inlet, the wheel and through the outlets at a given pressure to cause the streams of the liquid coloring passing through the outlets to traverse the path, means *operatively connected to said article-advancing means* to rotate the wheel [at a predetermined speed relative to] *and to maintain a fixed ratio between the peripheral speed of the wheel and* the linear speed of the [insulated wire to cause streams of the coloring liquid to pass through the outlets to] *article, said ratio for the predetermined sizes and spacings of the outlets being such that the portions of the rotating radial streams intercepting the longitudinally advancing article* form [color code markings,] on the [insulated wire,] *article discrete, longitudinally spaced, color code* markings of *relative* sizes comparable to the *relative* sizes of the outlets and at *relative* positions on the *article* [insulated wire] comparable to the *relative* spacing of the outlets in the peripheral member, and a baffled housing enclosing the wheel and surrounding the path to receive the excess liquid coloring and direct it to the supply receptacle.

7. An apparatus for color coding *elongated articles* [an insulated wire] comprising means *for advancing such articles* [to advance the insulated wire] in a longitudinal path and at a known linear speed, like hollow wheels for a coloring liquid disposed upon opposing sides of the path and having peripheral members and central inlets, *a support for the wheels,* means to feed the coloring liquid to the inlets, outlets of predetermined sizes for the wheels disposed at positions spaced predetermined distances apart to direct streams of the coloring liquid radially from the wheels, means to force the coloring liquid through the feeding means, the central inlets, the wheels and through the outlets to form radial streams of lengths sufficient to cross the path, [means to rotatably support the wheels on their opposing sides of the path,] and means to rotate the wheels in timed relation with each other to cause their streams of coloring liquid jointly to form band-like markings on the *articles* [insulated wire].

8. An apparatus for color coding *elongated articles* [an insulated wire] comprising means to advance the *articles* [insulated wire] in a longitudinal path and at a known linear speed, like hollow wheels for a coloring liquid disposed upon opposing sides of the path and having peripheral members and central inlets, means to feed the coloring liquid to the inlets, outlets of predetermined sizes for the wheels disposed at positions spaced predetermined distances apart to direct streams of the coloring liquid radially from the wheels, means to force the coloring liquid through the feeding means, the central inlets, the wheels and through the outlets to form radial streams of lengths sufficient to cross the path, means to rotatably support the wheels on their opposing sides of the path, [and] means to rotate the wheels in timed relation with each other to cause their streams of coloring liquid jointly to form band-like markings on the *articles* [insulated wire], a receptacle for the liquid coloring, and a baffled housing surrounding the path and enclosing the wheels to receive the excess liquid coloring and direct it to the receptacle.

9. An apparatus for color coding *elongated articles* [an insulated wire] comprising means to advance the *articles* [insulated wire] in a longitudinal path and at a known linear speed, like hollow wheels for a coloring liquid disposed upon opposing sides of the path and having peripheral members and central inlets, means to feed the coloring liquid to the inlets, outlets of predetermined sizes for the wheels disposed at positions spaced predetermined distances apart to direct streams of the coloring liquid radially from the wheels, means to force the coloring liquid through the feeding means, the central inlets, the wheels and through the outlets to form radial streams of lengths sufficient to cross the path, means to rotatably support the wheels on their opposing sides of the path, and means to rotate the wheels in timed relation with each other to cause their streams of coloring liquid jointly to form band-like markings on the *articles* [insulated wire], the supporting means for the wheels locating them at different positions along the path and the timed relation of the driving means for the wheels being such that partial band-like marks made by the streams of coloring liquid from one wheel will be completed subsequently by the streams of coloring liquid from the other wheel.

10. An apparatus for color coding an insulated wire comprising means to advance the insulated wire in a longitudinal path and at a known linear speed, like hollow wheels for a coloring liquid disposed upon opposing sides of the path and having peripheral members and central inlets, means to feed the coloring liquid to the inlets, outlets of predetermined sizes for the wheels disposed at positions spaced predetermined distances apart to direct streams of the coloring liquid radially from the wheels, means to force the coloring liquid through the feeding means, the central inlets, the wheels and through the outlets to form radial streams of lengths sufficient to cross the path, means to rotatably support the wheels on their opposing sides of the path, means to rotate the wheels in timed relation with each other to cause their streams of coloring liquid jointly to form band-like markings on the insulated wire, the supporting means for the wheels locating them at different positions along the path and the timed relation of the driving means for the wheels being such that partial band-like marks made by the streams of coloring liquid from one wheel will be completed subsequently by the streams of coloring liquid from the other wheel, and means to cause relative actuation of the wheels to synchronize them to assure matching of the relative band-like markings.

References Cited in the file of this patent
or the original patent

UNITED STATES PATENTS

| | | |
|---|---|---|
| 951,147 | Porter | Mar. 8, 1910 |
| 1,348,974 | Ainsworth | Apr. 10, 1920 |
| 1,583,577 | Coleman | May 4, 1926 |
| 1,833,497 | Prouty | Nov. 24, 1931 |
| 1,904,254 | Scranton | Apr. 18, 1933 |
| 1,946,831 | Bracewell | Feb. 13, 1934 |
| 1,956,951 | Hensky | May 1, 1934 |
| 2,428,284 | Krogel | Sept. 30, 1947 |
| 2,450,599 | Kloda | Oct. 5, 1948 |
| 2,553,592 | Kucklinsky | May 22, 1951 |
| 2,676,565 | McDermott | Apr. 27, 1954 |